United States Patent
Iino et al.

(12) 
(10) Patent No.: US 6,854,449 B2
(45) Date of Patent: Feb. 15, 2005

(54) CONTROL APPARATUS FOR INTERNAL COMBUSTION ENGINE

(75) Inventors: Junya Iino, Wako (JP); Yasuaki Asaki, Wako (JP); Mikio Fujiwara, Wako (JP); Jiro Takagi, Wako (JP); Katsumi Noguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/825,818

(22) Filed: Apr. 15, 2004

(65) Prior Publication Data

US 2004/0209735 A1 Oct. 21, 2004

(30) Foreign Application Priority Data

Apr. 16, 2003 (JP) ....................... 2003-111624

(51) Int. Cl.⁷ ............................................. F02D 7/00
(52) U.S. Cl. .................. 123/481; 701/112; 477/111
(58) Field of Search .......................... 123/481, 198 F, 123/198 DB; 477/111; 701/112, 104

(56) References Cited

U.S. PATENT DOCUMENTS 6,243,641 B1 * 6/2001 Andrews et al. ............ 701/102
6,408,618 B2 * 6/2002 Ide ............................... 60/285
6,672,277 B2 * 1/2004 Yasuoka et al. ............. 123/295
2004/0163623 A1 * 8/2004 Fukusako et al. ...... 123/406.33

FOREIGN PATENT DOCUMENTS

JP          8-105339          4/1996

* cited by examiner

*Primary Examiner*—John T. Kwon
(74) *Attorney, Agent, or Firm*—Lahive & Cockfield, LLP; Anthony A. Laurentano, Esq.

(57) ABSTRACT

A control apparatus for an internal combustion engine having a plurality of cylinders and a cylinder halting mechanism. The cylinder halting mechanism switches between an all-cylinder operation in which all of the plurality of cylinders are operated and a partial-cylinder operation in which at least one of the plurality of cylinders is halted. Operating parameters of the engine and the atmospheric pressure are detected. The cylinder halting mechanism is controlled to perform the all-cylinder operation or the partial-cylinder operation according to the operating parameters of the engine and the detected atmospheric pressure.

9 Claims, 8 Drawing Sheets

CONTROL APPARATUS FOR INTERNAL COMBUSTION ENGINE

BACKGROUND OF THE INVENTION

1. Field of the Invention

The present invention relates to a control apparatus for an internal combustion engine, and more particularly to a control apparatus for an internal combustion engine having a plurality of cylinders, provided with a cylinder halting mechanism for halting operation of some of the cylinders.

2. Description of the Related Art

Japanese Patent Laid-Open No. Hei 8-105339 discloses a control system for an internal combustion engine provided with a cylinder halting mechanism. In this control system, partial-cylinder operation in which some of cylinders of the engine are halted, and all-cylinder operation in which all of the cylinders are operated, are switched according to an engine load, i.e., a throttle valve opening. Specifically, according to this control system, the partial-cylinder operation is performed when the throttle valve opening TPS is less than a switching throttle valve opening TPS1 which is set according to the engine rotational speed Ne.

If a vehicle driven by the internal combustion engine described above travels on highlands where the atmospheric pressure is low, the intake pressure of the engine is saturated with a comparatively small throttle valve opening. Accordingly, the output power of the engine does not increase even if the throttle valve opening is increased further. Therefore, according to the conventional control system described above, when the vehicle travels on high ground, the intake pressure is saturated before the throttle valve opening TPS reaches the switching throttle valve opening TPS1, even if the driver operates the accelerator pedal during the partial-cylinder operation to open the throttle valve. Accordingly, the engine output power does not increase any more. Thereafter, when the throttle valve opening TPS reaches the switching throttle valve opening TPS1, the all-cylinder operation starts (the partial-cylinder operation ends), and the engine output power increases. As a result, the engine output power does not linearly increase depending on the accelerator operation of the driver, which gives strange feeling to the driver.

SUMMARY OF THE INVENTION

It is an object of the present invention to provide a control apparatus for an internal combustion engine which can suitably perform switching between the partial-cylinder operation and the all-cylinder operation even when the atmospheric pressure changes, to thereby increase the engine output power substantially linearly in response to the accelerator operation.

To attain the above object, the present invention provides a control apparatus for an internal combustion engine (1) having a plurality of cylinders and switching means (30) for switching between an all-cylinder operation in which all of the plurality of cylinders are operated and a partial-cylinder operation in which at least one of the plurality of cylinders is halted. The control apparatus includes operating parameter detecting means, instructing means, atmospheric pressure detecting means (14), and inhibiting means. The operating parameter detecting detects at least one operating parameter (TH, TW, TA, NE) of the engine. The instructing means instructs the switching means (30) to perform the all-cylinder operation or the partial-cylinder operation according to the at least one operating parameter. The atmospheric pressure detecting detects the atmospheric pressure (PA). The inhibiting means inhibits the partial-cylinder operation when the detected atmospheric pressure (PA) is lower than a predetermined pressure (PACS).

With this configuration, when the detected atmospheric pressure is lower than the predetermined pressure, the partial-cylinder operation is inhibited. If the engine operation region where the partial-cylinder operation is to be performed is determined, for example, based on the throttle valve opening, only the all-cylinder operation is performed while the partial-cylinder operation is inhibited on highlands where the intake pressure of the engine is saturated with a throttle valve opening smaller than the threshold value which is set on lowlands. Consequently, an engine operating region where the engine output power does not change after the intake pressure is saturated and before the throttle valve opening reaches the threshold value, can be eliminated, to thereby make the engine output power substantially linearly follow up the accelerator operation. In other words, it becomes possible to make the engine output power increase substantially linearly to the accelerator operation.

Preferably, the operating parameter detecting means detects a load on the engine (TH) and a rotational speed (NE) of the engine, and the instructing means instructs the switching means to perform the partial-cylinder operation when the detected load (TH) on the engine is less than a determination threshold value (THCS) and the detected engine rotational speed (NE) is lower than a predetermined rotational speed (NECS).

Preferably, the control apparatus further includes vehicle speed detecting means for detecting a running speed (VP) of a vehicle driven by the engine, and gear position detecting means for detecting a gear position (GP) of a transmission of the vehicle. The determination threshold value (THCS, APCS) is set according to the detected running speed (VP) and the detected gear position (GP).

The present invention further provides a control apparatus for an internal combustion engine (1) having a plurality of cylinders and switching means for switching between an all-cylinder operation in which all of the plurality of cylinders are operated and a partial-cylinder operation in which at least one of the plurality of cylinders is halted. The control apparatus includes load detecting means, atmospheric pressure detecting means, determination threshold value setting means, and instructing means. The load detecting means detects a load (TH) on the engine, and the atmospheric pressure detecting means detects an atmospheric pressure (PA). The determination threshold value setting means sets a determination threshold value (THCSPA) according to the detected atmospheric pressure (PA). The instructing means instructs the switching means (30) to perform the partial-cylinder operation when the detected load (TH) on the engine is lower than the determination threshold value (THCSPA).

With this configuration, the determination threshold value is set according to the detected atmospheric pressure, and the partial-cylinder engine is performed when the detected engine load is lower than the determination threshold value. If the partial-cylinder operation is performed when the engine load, e.g., the throttle valve opening, is less than the determination threshold value, by setting the determination threshold value to a lower load value as the atmospheric pressure decreases, it becomes possible to switch from the partial-cylinder operation to the all-cylinder operation at a throttle valve opening in the vicinity of the throttle valve opening with which the intake pressure is saturated. As a result, an engine operating region where the engine output power does not change after the intake pressure is saturated and before the throttle valve opening reaches the determination threshold value, can be eliminated, to thereby make the engine output power substantially linearly follow up the accelerator operation.

Preferably, the determination threshold value setting means sets the determination threshold value (THCSPA) to a value that becomes less as the atmospheric pressure (PA) becomes lower.

Preferably, the control apparatus further includes vehicle speed detecting means for detecting a running speed (VP) of a vehicle driven by the engine, and gear position detecting means for detecting a gear position (GP) of a transmission of the vehicle. The determination threshold value setting means calculates a load threshold value (THCS) according to the detected running speed (VP) and the detected gear position (GP), and calculates the determination threshold value (THCSPA) by correcting the load threshold value (THCS) according to the detected atmospheric pressure (PA).

DETAILED DESCRIPTION OF THE PREFERRED EMBODIMENTS

Embodiments of the present invention will be hereinafter described with reference to the drawings.

First Embodiment

Figure 1:
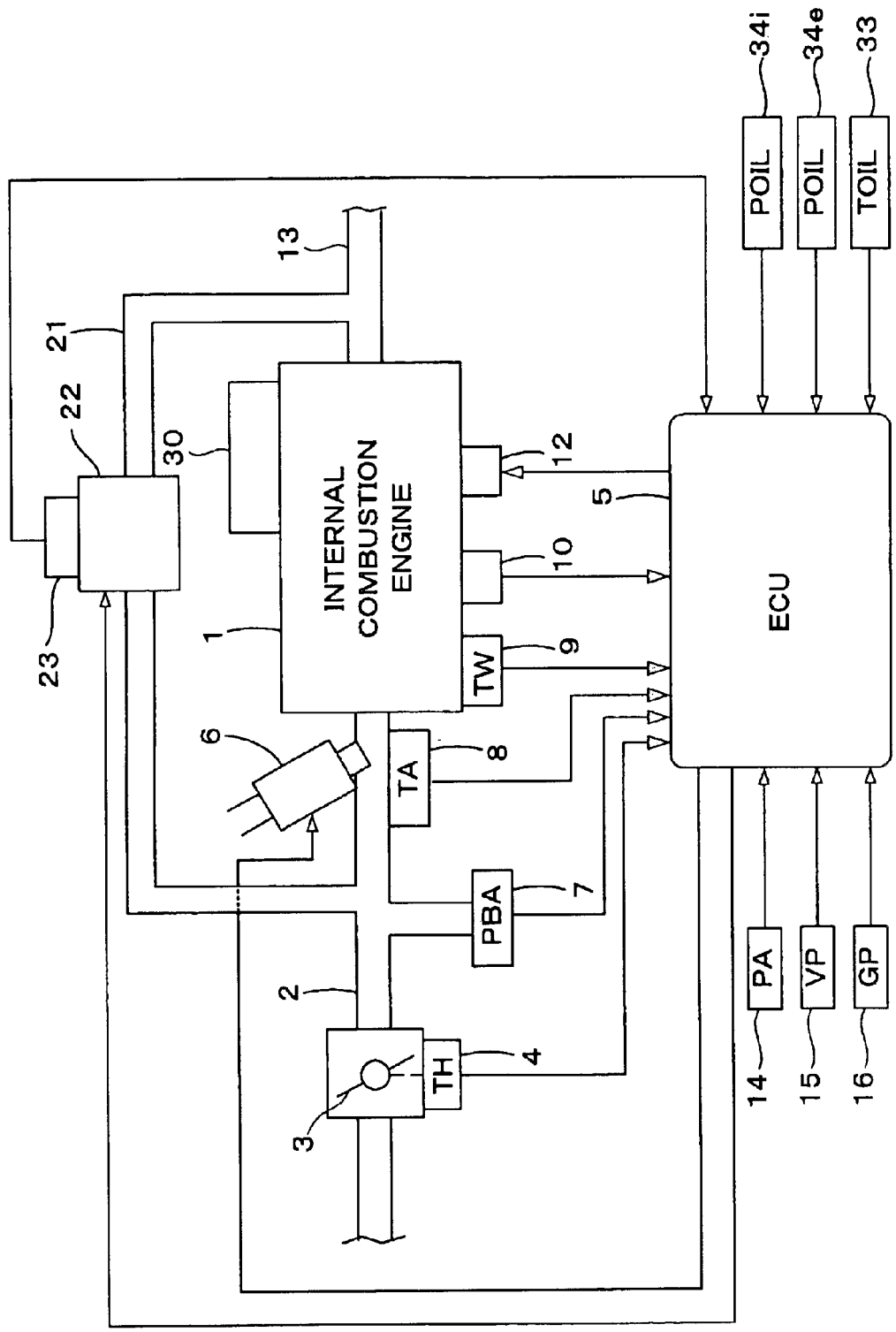
FIG. 1 is a schematic diagram showing a configuration of an internal combustion engine and a control apparatus therefor according to an embodiment of the present invention.
Figure 2:
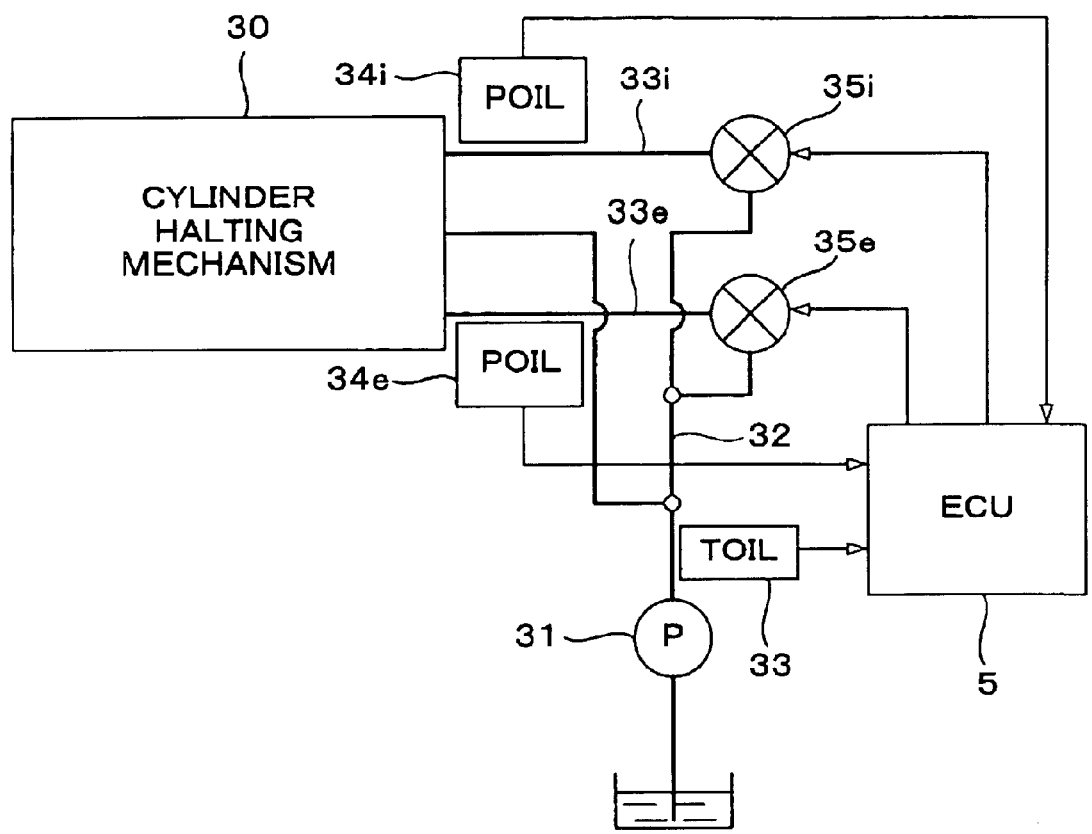
FIG. 2 is a schematic diagram showing a configuration of a hydraulic control system of a cylinder halting mechanism.

FIG. 1 is a schematic diagram of an internal combustion engine and a corresponding control apparatus according to a first embodiment of the present invention. The internal combustion engine 1, which may be, for example, a V-type six-cylinder internal combustion engine but is hereinafter referred to as simply as "engine", has a right bank provided with cylinders #1, #2, and #3 and a left bank provided with cylinders #4, #5, and #6. The right bank is further provided with a cylinder halting mechanism 30, which temporarily halts operation of cylinders #1 to #3. FIG. 2 is a schematic diagram of a hydraulic circuit for hydraulically driving the cylinder halting mechanism 30 and a control system for the hydraulic circuit. FIG. 2 will be referred to in conjunction with FIG. 1.

The engine 1 has an intake pipe 2 provided with a throttle valve 3. The throttle valve 3 is provided with a throttle valve opening sensor 4, which detects the throttle valve 3 is open TH. A detection signal output from the throttle opening sensor 4 is supplied to an electronic control unit, which is hereinafter referred to as "ECU 5".

Fuel injection valves 6, for respective cylinders, are inserted into the intake pipe 2 at locations intermediate the engine 1 and the throttle valve 3, and slightly upstream of respective intake valves (not shown). Each fuel injection valve 6 is connected to a fuel pump (not shown) and electrically connected to the ECU 5. A valve opening period of each fuel injection valve 6 is controlled by a signal from the ECU 5.

An absolute intake pressure (PBA) sensor 7 is provided immediately downstream of the throttle valve 3 and detects a pressure in the intake pipe 2. An absolute pressure signal converted to an electrical signal by the absolute intake pressure sensor 7 is supplied to the ECU 5. An intake air temperature (TA) sensor 8 is provided downstream of the absolute intake pressure sensor 7 and detects an intake air temperature TA. An electrical signal corresponding to the detected intake air temperature TA is output from the sensor 8 and supplied to the ECU 5.

An engine coolant temperature (TW) sensor 9 such as, for example, a thermistor, is mounted on the body of the engine 1 and detects an engine coolant temperature, i.e., a cooling water temperature, TW. A temperature signal corresponding to the detected engine coolant temperature TW is output from the sensor 9 and supplied to the ECU 5.

A crank angle position sensor 10 detects a rotational angle of the crankshaft (not shown) of the engine 1 and is connected to the ECU 5. A signal corresponding to the detected rotational angle of the crankshaft is supplied to the ECU 5. The crank angle position sensor 10 includes a cylinder discrimination sensor which outputs a pulse at a predetermined crank angle position for a specific cylinder of the engine 1, the pulse hereinafter is referred to as "CYL pulse". The crank angle position sensor 10 also includes a top dead center (TDC) sensor which outputs a TDC pulse at a crank angle position before a TDC of a predetermined crank angle starts at an intake stroke in each cylinder, i.e., at every 120 deg crank angle in the case of a six-cylinder engine, and a constant crank angle (CRK) sensor for generating one pulse with a CRK period, e.g., a period of 30 deg, shorter than the period of generation of the TDC pulse, the pulse hereinafter is referred to as "CRK pulse". The CYL pulse, the TDC pulse, and the CRK pulse are supplied to the ECU 5. The CYL, TDC, and CRK pulses are used to control the various timings, such as a fuel injection timing and an ignition timing, and to detect an engine rotational speed NE.

The cylinder halting mechanism 30 is hydraulically driven using lubricating oil of the engine 1 as operating oil. The operating oil, which is pressurized by an oil pump 31, is supplied to the cylinder halting mechanism 30 via an oil passage 32, an intake side oil passage 33$i$, and an exhaust side oil passage 33$e$. An intake side solenoid valve 35$i$ is provided between the oil passage 32 and the intake side oil passage 33$i$, and an exhaust side solenoid valve 35$e$ is provided between the oil passage 32 and the exhaust side oil passage 33$e$. The intake and exhaust side solenoid valves 35$i$ and 35$e$, respectively, are connected to the ECU 5 so operation of the solenoid valves 35$i$ and 35$e$ is controlled by the ECU 5.

Hydraulic switches 34$i$ and 34$e$, which are turned on when the operating oil pressure drops to a pressure lower than a predetermined threshold value, are provided, respectively, for the intake and exhaust side oil passages 33$i$ and 33$e$. Detection signals of the hydraulic switches 34$i$ and 34$e$ are supplied to the ECU 5. An operating oil temperature sensor 33, which detects an operating oil temperature TOIL, is provided in the oil passage 32, and a detection signal of the operating oil temperature sensor 33 is supplied to the ECU 5.

An exemplary configuration of a cylinder halting mechanism is disclosed in Japanese Patent Laid-open No. Hei 10-103097, and a similar cylinder halting mechanism is used as the cylinder halting mechanism 30 of the present invention. The contents of Japanese Patent Laid-open No. Hei 10-103097 are hereby incorporated by reference. According to the cylinder halting mechanism 30, when the solenoid valves 35$i$ and 35$e$ are closed and the operating oil pressures in the oil passages 33$i$ and 33$e$ are low, the intake valves and the exhaust valves of the cylinders, i.e., #1 to #3, perform normal opening and closing movements. On the other hand, when the solenoid valves 35$i$ and 35$e$ are open and the operating oil pressures in the oil passages 33$i$ and 33$e$ are high, the intake valves and the exhaust valves of the cylinders, i.e., #1 to #3, maintain their closed state. In other words, while the solenoid valves 35$i$ and 35$e$ are closed, all-cylinder operation of the engine 1, in which all cylinders are operating, is performed, and if the solenoid valves 35$i$ and 35$e$ are opened, partial-cylinder operation, in which the cylinders #1 to #3 do not operate and only the cylinders #4 to #6 are operating, is performed.

An exhaust gas recirculation passage 21 extends between a portion of the intake pipe 2 downstream of the throttle valve 3 and an exhaust pipe 13. The exhaust gas recirculation passage 21 has an exhaust gas recirculation valve, hereinafter referred to as "EGR valve" 22, to control the amount of a recirculated exhaust gas. The EGR valve 22 includes a solenoid-operated valve, the opening of the valve being controlled by the ECU 5. The EGR valve 22 is combined with a lift sensor 23 to detect its valve opening, i.e., valve lift amount, LACT, and supplies a detection signal to the ECU 5. The exhaust gas recirculation passage 21 and the EGR valve 22 jointly form an exhaust gas recirculation mechanism.

A spark plug 12 is provided in each cylinder of the engine 1. Each spark plug 12 is connected to the ECU 5, and a drive signal for each spark plug 12, i.e., an ignition signal, is supplied from the ECU 5.

An atmospheric pressure sensor 14 for detecting the atmospheric pressure PA, a vehicle speed sensor 15 for detecting a running speed (vehicle speed) VP of the vehicle driven by the engine 1, and a gear position sensor 16 for detecting a gear position GP of a transmission of the vehicle. Detection signals of these sensors are supplied to the ECU 5.

The ECU 5 includes an input circuit, a central processing unit, which is hereinafter referred to as "CPU", a memory circuit, and an output circuit. The input circuit performs numerous functions, including, but not limited to, shaping the waveforms of input signals from the various sensors, correcting the voltage levels of the input signals to a predetermined level, and converting analog signal values into digital signal values. The memory circuit preliminarily stores various operating programs to be executed by the CPU and stores the results of computations or the like by the CPU. The output circuit supplies drive signals to the fuel injection valves 6, the spark plugs 12, the EGR valve 22, and the solenoid valves 35$i$ and 35$e$. The ECU 5 controls the valve opening period of each fuel injection valve 6, the ignition timing, and the opening of the EGR valve 22 according to the detection signals from the various sensors. The ECU 5 further operates the intake and exhaust side solenoid valves 35$i$ and 35$e$ to perform switching control between the all-cylinder operation and the partial-cylinder operation of the engine 1.

Figure 3:
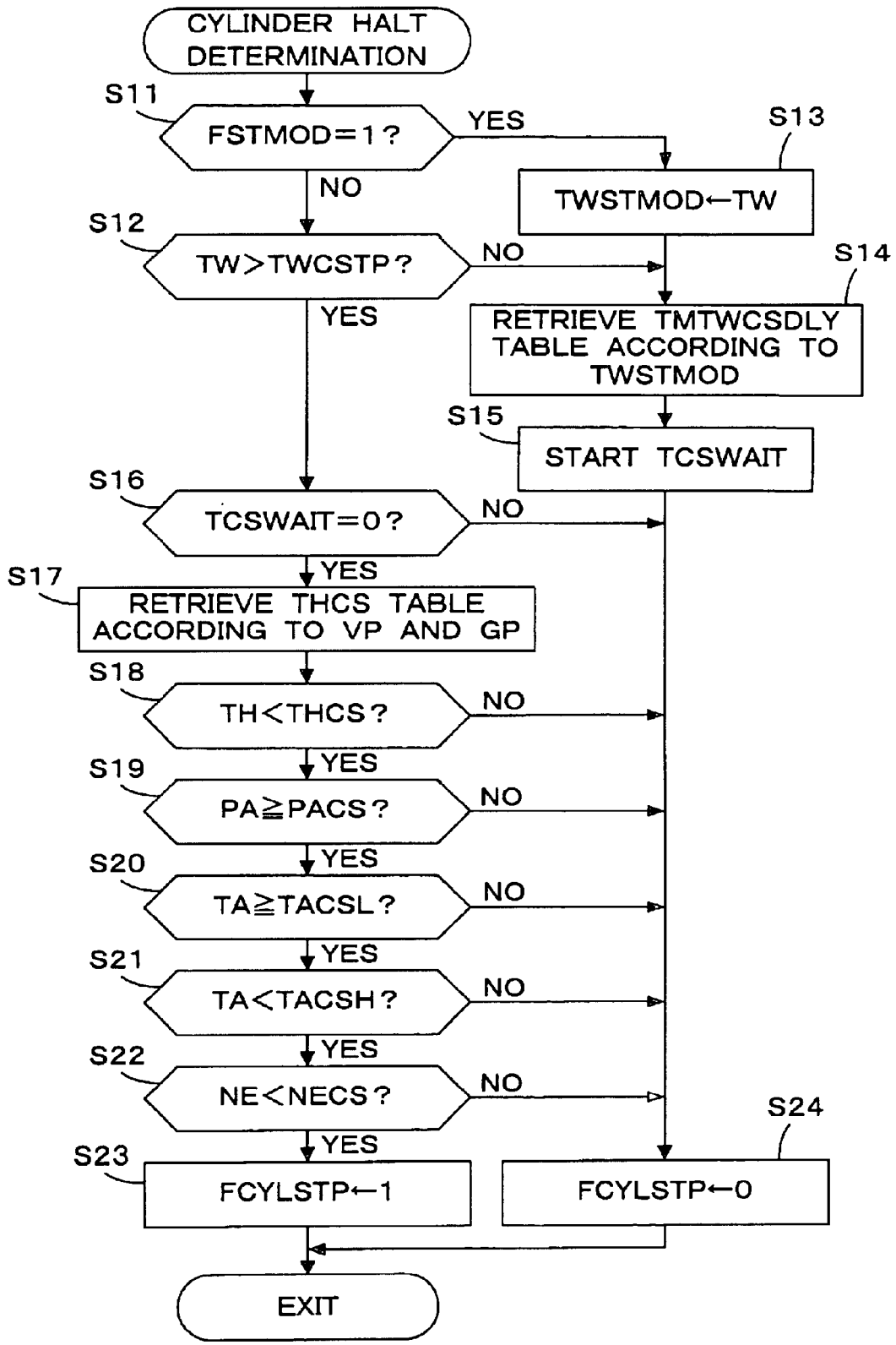
FIG. 3 is a flow chart of a process for determining a cylinder halt condition.

FIG. 3 is a flow chart of a process of determining an execution condition of the cylinder halt (partial-cylinder operation) in which some of the cylinders are halted. This process is executed at predetermined intervals (for example, 10 milliseconds) by the CPU of in ECU 5.

Figure 4:
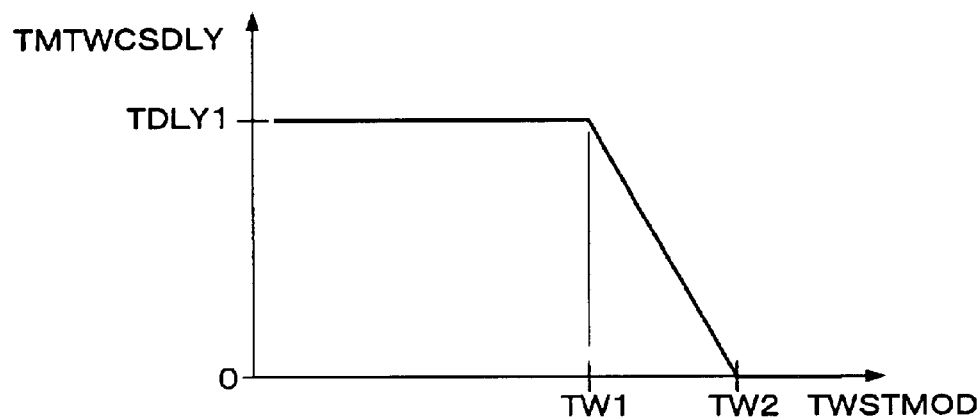
FIG. 4 is a graph showing a TMTWCSDLY table used in the process of FIG. 3.

In step S11, it is determined whether or not an start mode flag FSTMOD is "1". If FSTMOD is equal to "1", which indicates that the engine 1 is starting (cranking), then the detected engine water temperature TW is stored as a start mode water temperature TWSTMOD (step S13). Next, a TMTWCSDLY table shown in FIG. 4 is retrieved according to the start mode water temperature TWSTMOD to calculate a delay time TMTWCSDLY. In the TMTWCSDLY table, the delay time TMTWCSDLY is set to a predetermined delay time TDLY1 (for example, 250 seconds) in the range where the start mode water temperature TWSTMOD is lower than a first predetermined water temperature TW1 (for example, 40° C.). The delay time TMTWCSDLY is set so as to decrease as the start mode water temperature TWSTMOD rises in the range where the start mode water temperature TWSTMOD is is equal to or higher than the first predetermined water temperature TW1 and lower than a second predetermined water temperature TW2 (for example, 60° C.). Further, the delay time TMTWCSDLY is set to "0" in the range where the start mode water temperature TWSTMOD is higher than the second predetermined water temperature TW2.

In next step S15, a downcount timer TCSWAIT is set to the delay time TMTWCSDLY and started, and a cylinder halt flag FCYLSTP is set to "0" (step S24). This indicates that the execution condition of the cylinder halt is not satisfied.

If FSTMOD is equal to "0" in step S11, i.e., the engine 1 is operating in the ordinary operation mode, then it is determined whether or not the engine water temperature TW is higher than a cylinder halt determination temperature TWCSTP (for example, 75° C.) (step S12). If TW is less than or equal to TWCSTP, then it is determined that the execution condition is not satisfied, and the process advances to step S14. When the engine water temperature TW is higher than the cylinder halt determination temperature TWCSTP, the process advances from step S12 to step S16, in which it is determined whether or not a value of the timer TCSWAIT started in step S15 is "0". While TCSWAIT is greater than "0", the process advances to step S24. When TCSWAIT becomes "0", then the process advances step S17.

Figure 5:
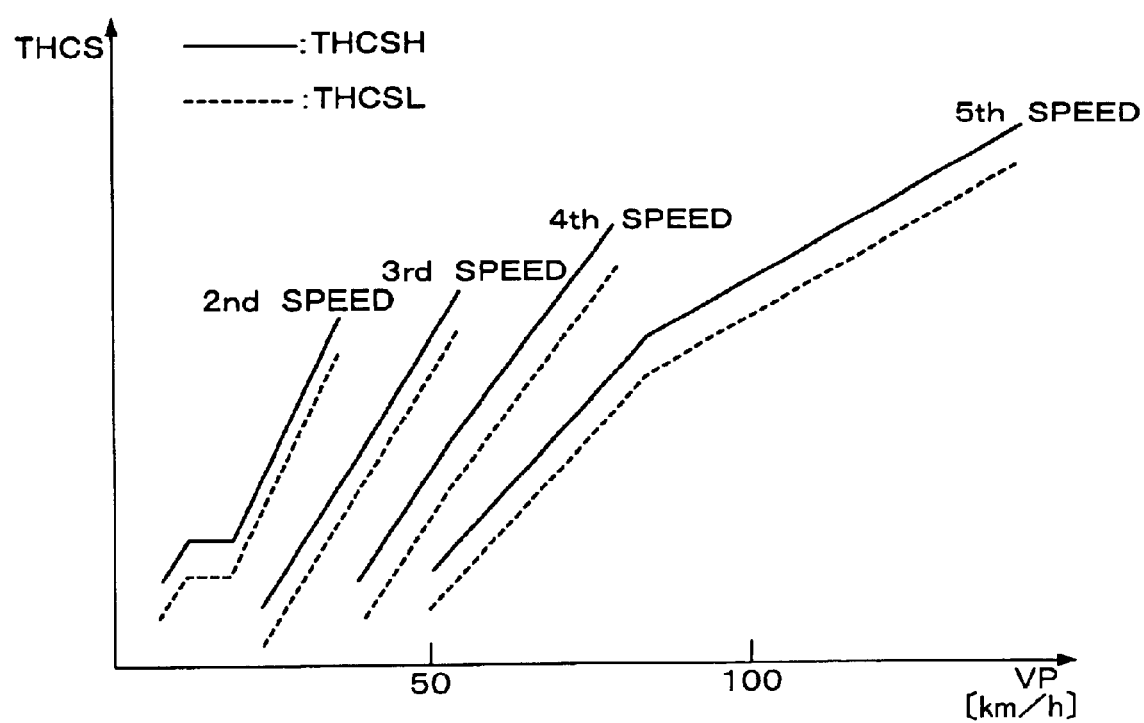
FIG. 5 is a graph showing a THCS table used in the process of FIG. 3.

In step S17, a THCS table shown in FIG. 5 is retrieved according to the vehicle speed VP and the gear position GP to calculate an upper side threshold value THCSH and a lower side threshold value THCSL which are used in the determination in step S18. In FIG. 5, the solid lines correspond to the upper side threshold value THCSH and the broken lines correspond to the lower side threshold value THCSL. The THCS table is set for each gear position GP such that, at each of the gear positions (from second speed to fifth speed), the upper side threshold value THCSH and the lower side threshold value THCSL may increase as the vehicle speed VP increases. It should be noted that at the gear position of 2nd speed, there is provided a region where the upper side threshold value THCSH and the lower side threshold value THCSL are maintained at a constant value even if the vehicle speed VP varies. Further, at the gear position of 1st speed, the upper side threshold value THCSH and the lower side threshold value THCSL are set, for example, to "0", since the all-cylinder operation is always performed. Furthermore, the threshold values (THCSH and THCSL) corresponding to a lower speed side gear position GP are set to greater values than the threshold values (THCSH and THCSL) corresponding to a higher speed side gear position GP when compared at a certain vehicle speed.

In step S18, a determination of whether or not the throttle valve opening TH is less than the threshold value THCS is executed with hysteresis. Specifically, when the cylinder halt flag FCYLSTP is "1", and the throttle valve opening TH increases to reach the upper side threshold value THCSH, then the answer to step S18 becomes negative (NO), while when the cylinder halt flag FCYLSTP is "0", and the throttle valve opening TH decreases to become less than the lower side threshold value THCSL, then the answer to step S18 becomes affirmative (YES).

If the answer to step S18 is affirmative (YES), it is determined whether or not the atmospheric pressure PA is equal to or higher than a predetermined pressure PACS (for example, 86.6 kPa (650 mmHg)) (step S19). If the answer to step S19 is affirmative (YES), then it is determined whether or not the intake air temperature TA is equal to or higher than a predetermined lower limit temperature TACSL (for example, −10° C.) (step S20). If the answer to step S20 is affirmative (YES), then it is determined whether or not the intake air temperature TA is lower than a predetermined upper limit temperature TACSH (for example, 45° C.) (step S21). If the answer to step S21 is affirmative (YES), then it is determined whether or not the engine speed NE is lower than a predetermined speed NECS (step S22). The determination of step S22 is executed with hysteresis similarly as in step S18. Specifically, when the cylinder halt flag FCYLSTP is "1", and the engine speed NE increases to reach an upper side speed NECSH (for example, 3,500 rpm), then the answer to step S22 becomes negative (NO), while when the cylinder halt flag FCYLSTP is "0", and the engine speed NE decreases to become lower than a lower side speed NECSL (for example, 3,300 rpm), then the answer to step S22 becomes affirmative (YES).

When the answer to any of steps S18 to S22 is negative (NO), it is determined that the execution condition of the cylinder halt is not satisfied, and the process advances to step S24. On the other hand, if all of the answers to steps S18 to S22 are affirmative (YES), it is determined that the execution condition of the cylinder halt is satisfied, and the cylinder halt flag FCYLSTP is set to "1" (step S23).

When the cylinder halt flag FCYLSTP is set to "1", the partial-cylinder operation in which cylinders #1 to #3 are halted while cylinders #4 to #6 are operated, is performed. When the cylinder halt flag FCYLSTP is set to "0", the all-cylinder operation in which all of the cylinders #1 to #6 are operated, is performed.

According to the process of FIG. 3, at highlands where the atmospheric pressure PA is lower than the predetermined pressure PACS, the execution condition of the cylinder halt is not satisfied, and the partial-cylinder operation is not performed. The reason for this control will be described below.

Figure 8:
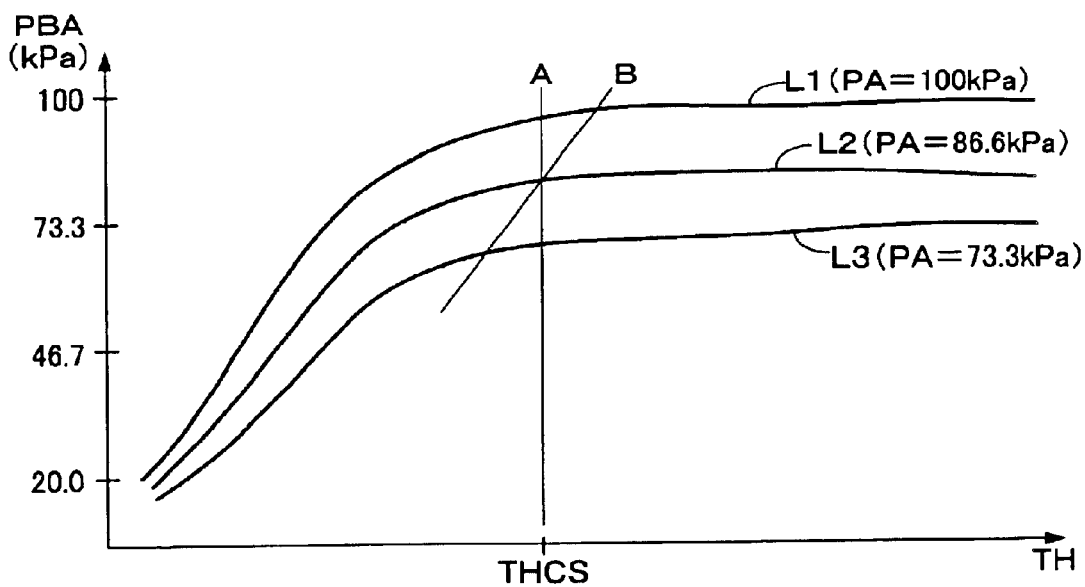
FIG. 8 is a graph showing a relationship between the throttle valve opening (TH) and the absolute intake pressure (PBA)

FIG. 8 illustrates a relationship between the throttle valve opening TH and the absolute intake pressure PBA when the engine speed NE is fixed. The lines L1, L2 and L3 correspond to conditions where the atmospheric pressure PA is 100 kPa, 86.6 kPa and 73.3 kPa, respectively. As can be seen apparently from this figure, as the atmospheric pressure PA decreases, the absolute intake pressure PBA is saturated with a less throttle valve opening TH. That is, when the atmospheric pressure PA is relatively low, the output torque of the engine 1 does not increase even if the driver pushes the accelerator pedal. Therefore, in the present embodiment, the cylinder halt execution condition is determined (step S18) using the threshold values THCS (refer to the line A) which is a throttle valve opening with which the absolute intake pressure PBA is saturated when the atmospheric pressure PA is 86.6 kPa, and the cylinder halting execution condition is not determined to be satisfied, thereby inhibiting the partial-cylinder operation, when the atmospheric pressure PA is lower than the predetermined pressure PACS (=86.6 kPa). Consequently, at highlands where the absolute intake pressure PBA is saturated with a comparatively low throttle valve opening as indicated, for example, by the line L3, the partial-cylinder operation is inhibited. The engine operating region where the engine output power does not change after the absolute intake pressure PBA is saturated and before the throttle valve opening TH reaches the threshold value, can be eliminated, to thereby make the engine output power substantially linearly follow up the accelerator operation.

In the present embodiment, the cylinder halting mechanism 30 corresponds to the switching means, and the throttle valve opening sensor 4, intake air temperature sensor 8, the engine water temperature sensor 9, and the crank angle position sensor 10 constitute the operating parameter detecting means. The atmospheric pressure sensor 14 corresponds to the atmospheric pressure detecting means. Further, the ECU 5 constitutes the instructing means and the inhibiting means. Specifically, steps S11 to S18 and steps S20 to S24 of FIG. 3 correspond to the instructing means, and step S19 of FIG. 3 corresponds to the inhibiting means.

Second Embodiment

Figure 6:
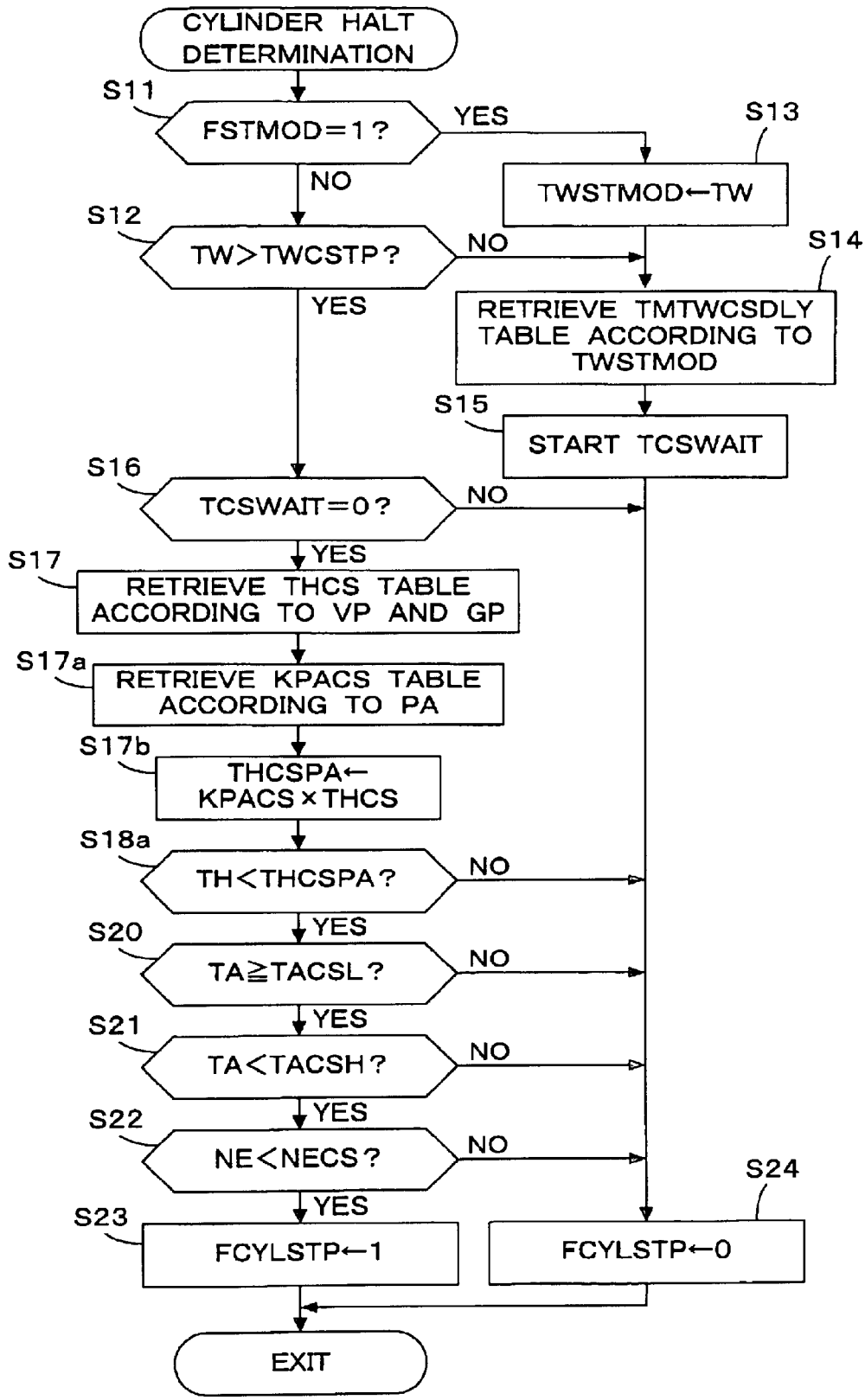
FIG. 6 is a flow chart of another process (second embodiment) for determining a cylinder halt condition.

FIG. 6 is a flow chart of a cylinder halting condition determination process according to a second embodiment of the present invention. The process of FIG. 6 is obtained by deleting step S19 of the process shown in FIG. 3, adding steps S17a and 17b, and replacing the step S18 with step S18a. It is to be noted that the second embodiment is the same as the first embodiment except the points described below.

Figure 7:
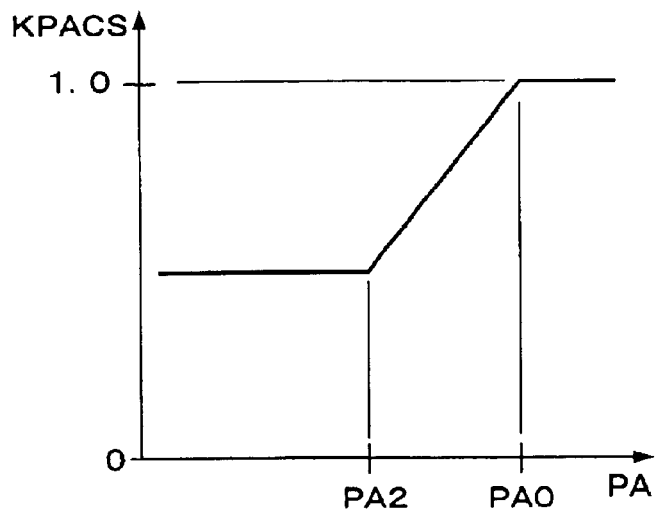
FIG. 7 is a graph showing a table used in the process of FIG. 6.

In step S17a, a KPACS table shown in FIG. 7 is retrieved according to the atmospheric pressure PA to calculate a correction coefficient KPACS. In the KPACS table, the correction coefficient KPACS is set to "1.0" in the range where the atmospheric pressure PA is higher than a first predetermined pressure PA0 (for example, 101 kPa). The correction coefficient KPACS is set to "0.5" in the range where the atmospheric pressure PA is lower than a second predetermined pressure PA1 (for example, 87 kPa). The correction coefficient KPACS is set so as to decrease as the atmospheric pressure PA decreases in the range where the atmospheric pressure PA is between the first predetermined pressure PA0 and the second predetermined pressure PA1.

In step S17b, the threshold value THCS (the upper side threshold value THCSH and the lower side threshold value THCSL) is multiplied by the correction coefficient KPACS to calculate a corrected threshold value THCSPA (a corrected upper side threshold value THCSHPA and a corrected lower side threshold value THCSLPA).

In step S18a, it is determined with hysteresis whether or not the throttle valve opening TH is less than the corrected threshold values THCSPA. Specifically, when the cylinder halt flag FCYLSTP is "1", and the throttle vale opening TH increases to reach the corrected upper side threshold value THCSHPA, then the answer to step S18a becomes negative (NO). Further, when the cylinder halt flag FCYLSTP is "0", and the throttle valve opening TH decreases to become less than the corrected lower side threshold value THCSLPA, then the answer to step S18a becomes affirmative (YES).

The KPACS table shown in FIG. 7 is set so that a corrected threshold value THCSPA corresponding to a line B shown in FIG. 8 may be obtained. Accordingly, by using the value THCSPA corrected with the correction coefficient KPACS, the partial-cylinder operation can be switched to the all-cylinder operation at a throttle valve opening TH in the vicinity of the throttle valve opening with which the absolute intake pressure PBA reaches a saturated value. As a result, the engine operating region where the engine output power does not change after the absolute intake pressure PBA is saturated and before the throttle valve opening TH reaches the threshold value, can be eliminated, to thereby make the engine output power substantially linearly follow up the accelerator operation.

In the present embodiment, the cylinder halting mechanism 30 corresponds to the switching means, the throttle valve opening sensor 4 corresponds to the load detecting means, and the atmospheric pressure sensor 14 corresponds to the atmospheric pressure detecting means. Further, the ECU 5 constitutes the instruction means and the determination threshold value setting means. Specifically, steps S11 to S16 and steps S18a to S24 of FIG. 6 correspond to the instruction means, and steps S17, S17a and S17b of FIG. 6 correspond to the determination threshold value setting means.

It is to be noted that the present invention is not limited to the embodiments described above, but various modifications may be made. For example, in the embodiments described above, the threshold value THCS is calculated according to the vehicle speed VP, the correction coefficient KPACS is calculated according to the atmospheric pressure PA, and the threshold value THCS is multiplied by the correction coefficient KPACS to calculate the corrected threshold value THCSPA. Alternatively, a THCSPA map according to the vehicle speed VP and the atmospheric pressure PA may be previously stored in a memory such that the corrected threshold value THCSPA is calculated by retrieving the THCSPA map according to the detected vehicle speed VP and atmospheric pressure PA.

Further, in the embodiments described above, the throttle valve opening sensor 4 is used as a load detecting means. Alternatively, an acceleration sensor may be provided for detecting a depressing amount AP of the accelerator pedal (hereinafter referred to as "accelerator pedal operation amount AP") of a vehicle driven by the engine 1, and used as a load detecting means. In this case, the accelerator pedal operation amount AP is used as a parameter indicative of the engine load. In this modification, determination of the cylinder halt execution condition is performed by a process shown in FIG. 9 or FIG. 10. It is to be noted that the accelerator pedal is connected to the throttle valve 3 such that the throttle valve opening TH changes proportionally to the accelerator pedal operation amount AP.

Figure 9:
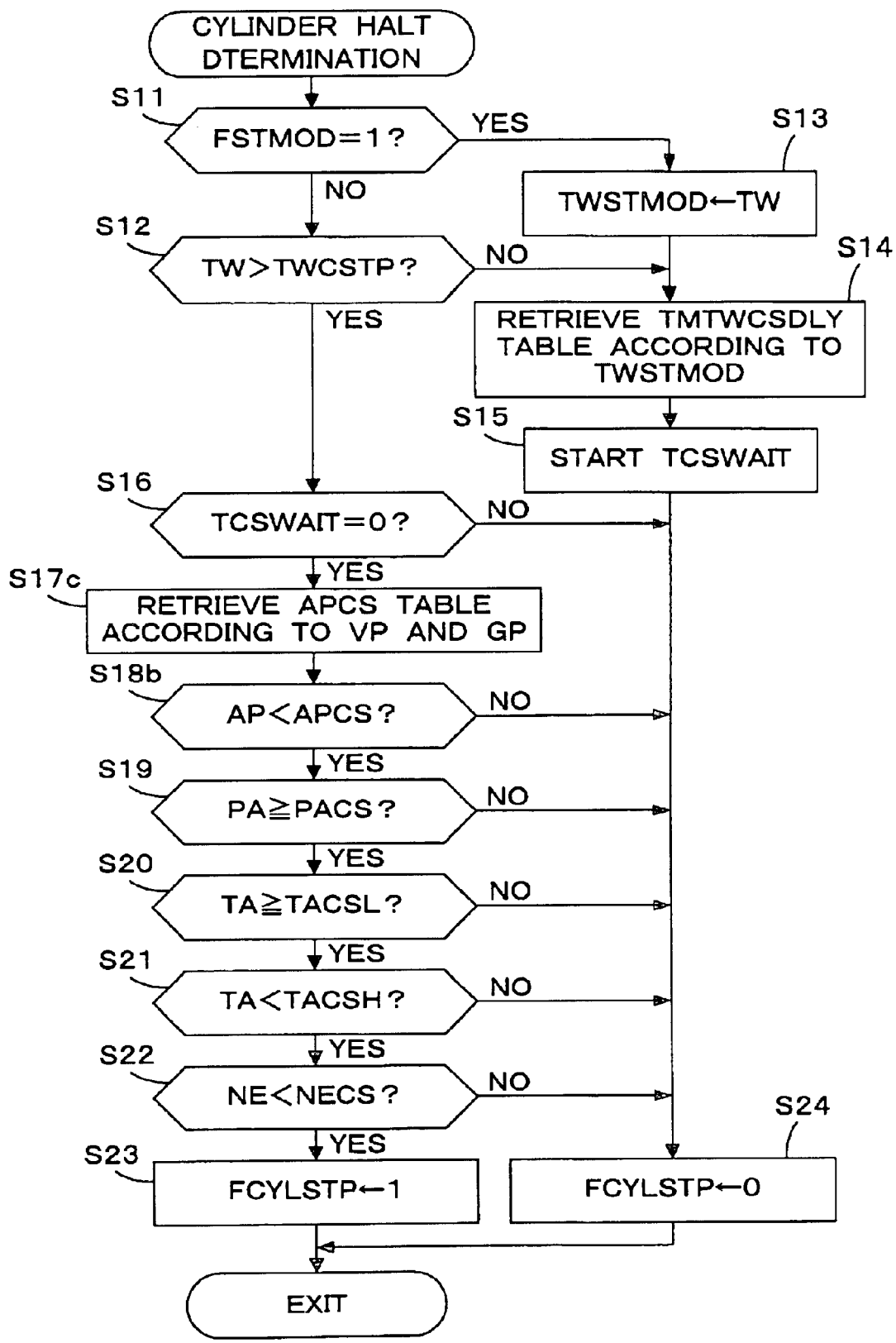
FIG. 9 is a flow chart showing a modification of the process of FIG. 3.

The process shown in FIG. 9 is obtained by replacing steps S17 and S18 of FIG. 3 with steps S17c and S18b, respectively. In step S17c, an APCS table (not shown) is retrieved according to the vehicle speed VP and the gear position GP to calculate a threshold value APCS (a lower side threshold value APCSL and an upper side threshold value APCSH) of the accelerator pedal operation amount AP. In step S18b, it is determined with hysteresis whether or not the detected accelerator pedal operation amount AP is less than the threshold values APCS. The APCS table is set similarly to the THCS table and is set for each of the gear positions GP such that the lower side threshold value APCSL and the upper side threshold value APCSH increase as the vehicle speed VP increases.

Figure 10:
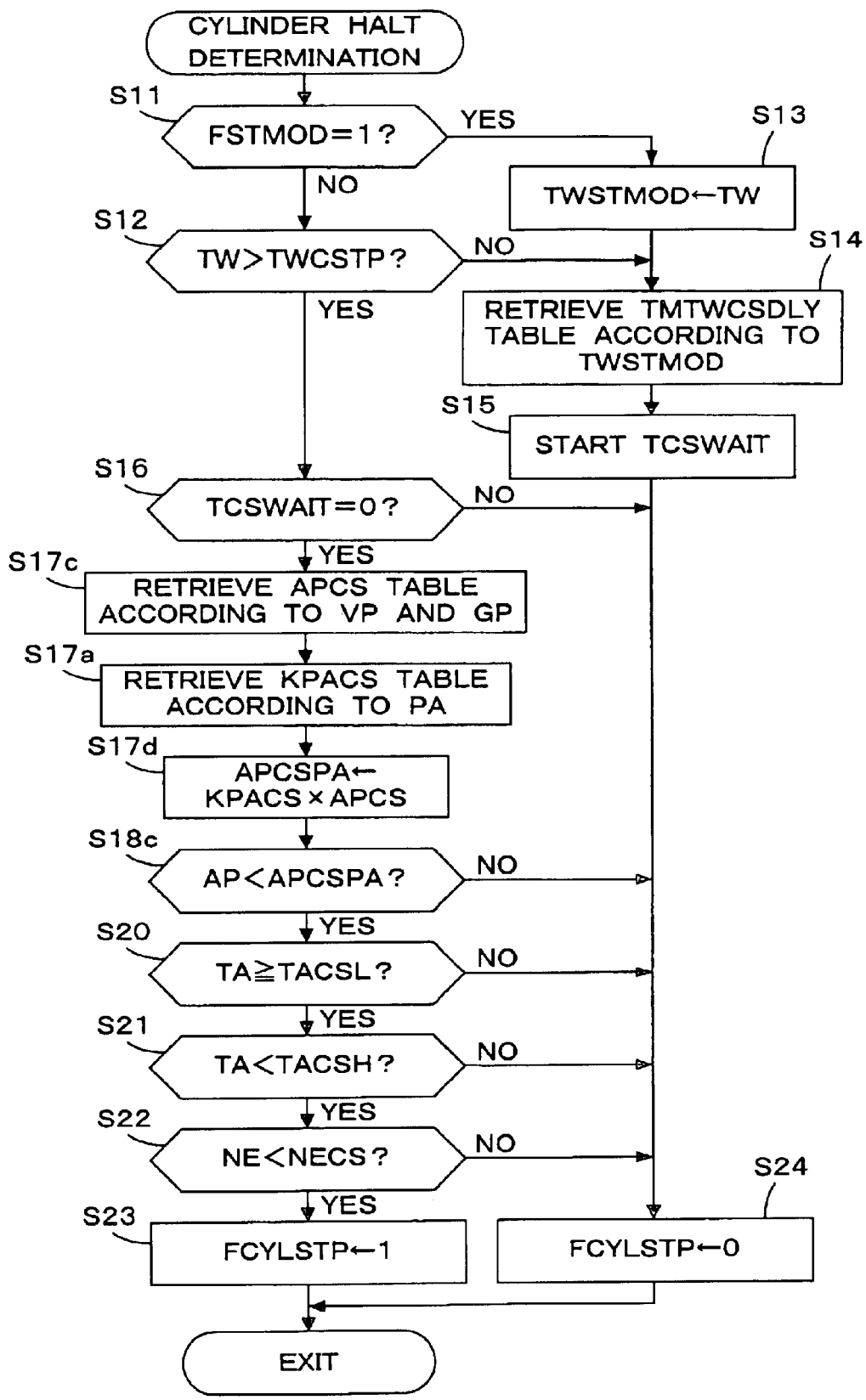
FIG. 10 is a flow chart showing a modification of the process of FIG. 6.

The process shown in FIG. 10 is obtained by replacing steps S17, S17b and S18a of FIG. 6 with steps S17c, S17d and S18c, respectively. In step S17c of FIG. 10, the same process as that in step S17c of FIG. 9 is performed. In step S17d, the threshold values APCS (the lower side threshold value APCSL and the upper side threshold value APCSH) is multiplied by the correction coefficient KPACS to calculate a corrected threshold value APCSPA (a corrected lower side threshold value APCSLPA and a corrected upper side threshold value APCSHPA). In step S18c, it is determined with hysteresis whether or not the detected accelerator pedal operation amount AP is less than the corrected threshold value APCSPA (the corrected lower side threshold value APCSLPA and the corrected upper side threshold value APCSHPA).

Furthermore, the present invention can be applied also to a control apparatus for a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control apparatus for an internal combustion engine having a plurality of cylinders and switching means for switching between an all-cylinder operation in which all of said plurality of cylinders are operated and a partial-cylinder operation in which at least one of said plurality of cylinders is halted, said control apparatus comprising:

operating parameter detecting means for detecting at least one operating parameter of said engine;

instructing means for instructing said switching means to perform the all-cylinder operation or the partial-cylinder operation according to the at least one operating parameter;

atmospheric pressure detecting means for detecting an atmospheric pressure; and inhibiting means for inhibiting the partial-cylinder operation when the detected atmospheric pressure is lower than a predetermined pressure.

2. A control apparatus according to claim 1, wherein said operating parameter detecting means detects a load on said engine and a rotational speed of said engine, and said instructing means instructs said switching means to perform the partial-cylinder operation, when the detected load on said engine is less than a determination threshold value and the detected engine rotational speed is lower than a predetermined rotational speed.

3. A control apparatus according to claim 2, further comprising:

vehicle speed detecting means for detecting a running speed of a vehicle driven by said engine; and gear position detecting means for detecting a gear position of a transmission of said vehicle, wherein the determination threshold value is set according to the detected running speed and the detected gear position.

4. A control method for an internal combustion engine having a plurality of cylinders and a switching mechanism for switching between an all-cylinder operation in which all of said plurality of cylinders are operated and a partial-cylinder operation in which at least one of said plurality of cylinders is halted, said control method comprising the steps of:

a) detecting at least one operating parameter of said engine;

b) instructing said switching mechanism to perform the all-cylinder operation or the partial-cylinder operation according to the at least one operating parameter;

c) detecting an atmospheric pressure; and d) inhibiting the partial-cylinder operation when the detected atmospheric pressure is lower than a predetermined pressure.

5. A control method according to claim 4, wherein said step a) of detecting at least one operating parameter of said engine includes the step of detecting a load on said engine and a rotational speed of said engine, and the partial-cylinder operation is performed when the detected load on said engine is less than a determination threshold value and the detected engine rotational speed is lower than a predetermined rotational speed.

6. A control method according to claim 5, further comprising the steps of:

i) detecting a running speed of a vehicle driven by said engine; and ii) detecting a gear position of a transmission of said vehicle, wherein the determination threshold value is set according to the detected running speed and the detected gear position.

7. A computer program for causing a computer to carry out a control method for an internal combustion engine having a plurality of cylinders and a switching mechanism for switching between an all-cylinder operation in which all of said plurality of cylinders are operated and a partial-cylinder operation in which at least one of said plurality of cylinders is halted, said control method comprising the steps of:

a) detecting at least one operating parameter of said engine;

b) instructing said switching mechanism to perform the all-cylinder operation or the partial-cylinder operation according to the at least one operating parameter;

c) detecting an atmospheric pressure; and d) inhibiting the partial-cylinder operation when the detected atmospheric pressure is lower than a predetermined pressure.

8. A computer program according to claim 7, wherein said step a) of detecting at least one operating parameter of said engine includes the step of detecting a load on said engine and a rotational speed of said engine, and the partial-cylinder operation is performed when the detected load on said engine is less than a determination threshold value and the detected engine rotational speed is lower than a predetermined rotational speed.

9. A computer program according to claim 8, wherein said control method further comprises the steps of:

i) detecting a running speed of a vehicle driven by said engine; and ii) detecting a gear position of a transmission of said vehicle, wherein the determination threshold value is set according to the detected running speed and the detected gear position.

* * * * *